Figure 3:
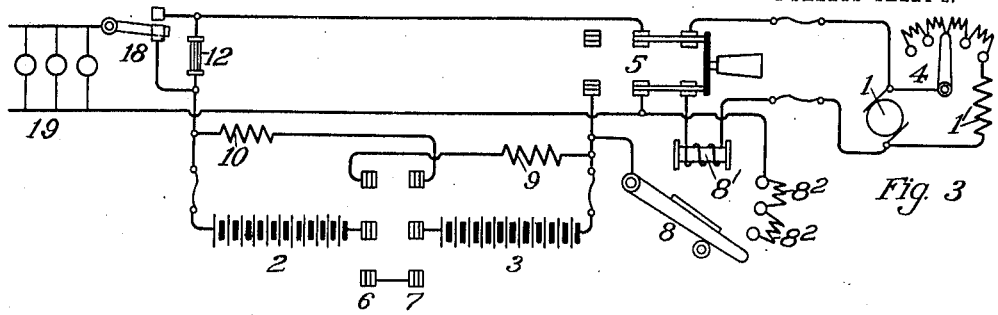

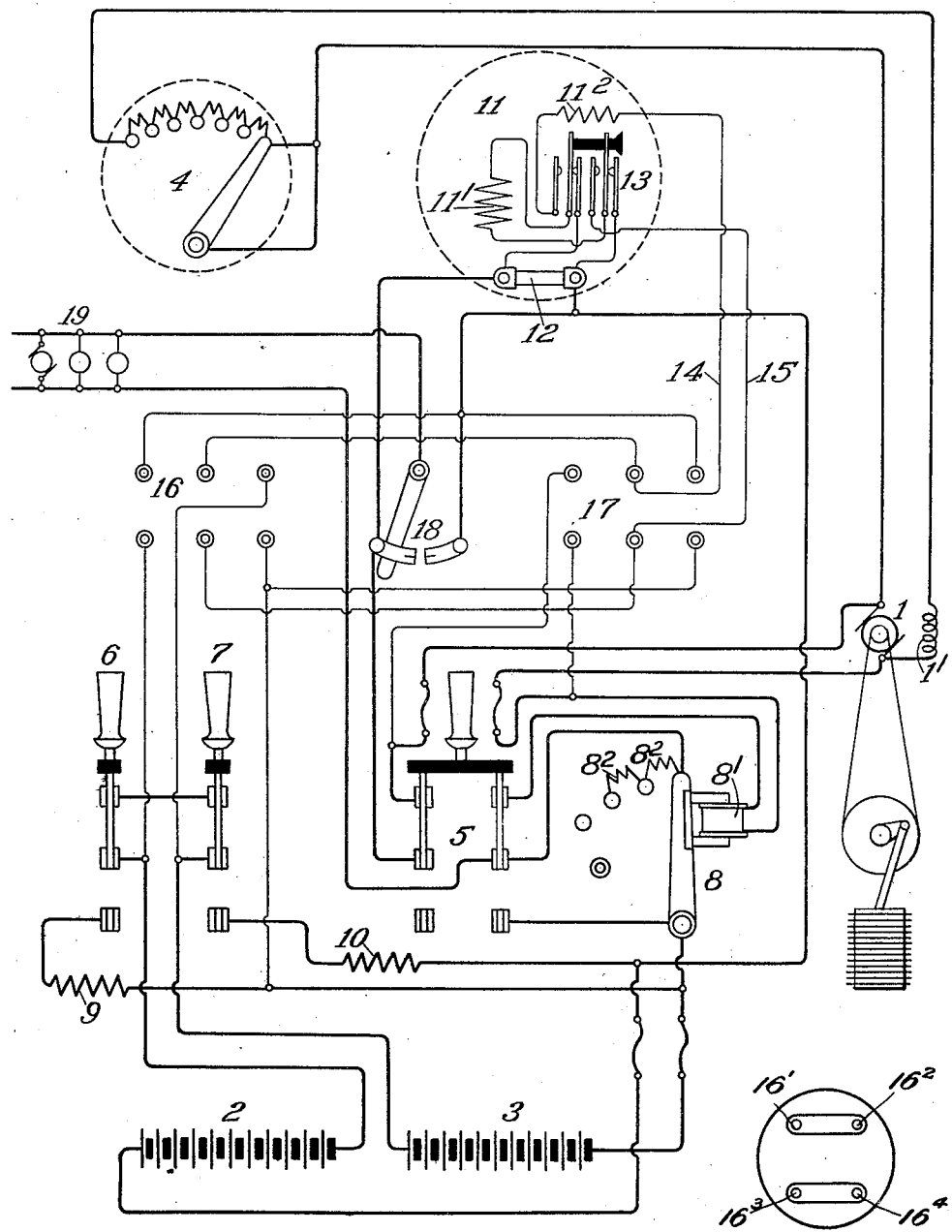

F. W. SCHARF.
ELECTRIC LIGHT AND POWER SWITCHBOARD.
APPLICATION FILED MAR. 22, 1911.

1,102,805.

Patented July 7, 1914.

Witnesses
J. S. Baker.
Leigh S. Keith

Inventor
Frank W. Scharf
By McPheen & Mills
Attys

UNITED STATES PATENT OFFICE.

FRANK W. SCHARF, OF SIOUX CITY, IOWA, ASSIGNOR TO INTERSTATE ELECTRIC & MFG. CO., OF SIOUX CITY, IOWA, A CORPORATION OF IOWA.

ELECTRIC LIGHT AND POWER SWITCHBOARD.

1,102,805.  Specification of Letters Patent.  Patented July 7, 1914.

Application filed March 22, 1911. Serial No. 616,222.

*To all whom it may concern:*

Be it known that I, FRANK W. SCHARF, a citizen of the United States of America, and a resident of Sioux City, Woodbury county, and State of Iowa, have invented a new and useful Improvement in Electric Light and Power Switchboards, of which the following is a specification.

My invention pertains to electric light and power plant switchboard systems and relates especially to novel and improved switching arrangements particularly adaptable to use in medium and small sized isolated plants, where it is neither convenient nor desirable to run the electric generator during the entire period that current is required for light or power purposes.

I employ an electrical generator driven by any of the well known means, such as by gas, oil or steam engine, water wheel or other prime mover. In order that electrical energy may be available in the power-using circuit during the idle period of the generator, I provide a storage battery with novel means for associating it with the generator and service mains. By the use of the particular arrangement which constitutes my invention I am enabled to furnish the energy direct to the circuit on which it is utilized from the generators or from the battery. I am further enabled to furnish energy to such circuits during the periods in which I am charging the storage battery. The storage battery is divided during charge and by employing a resistance in series with each portion of it I eliminate the necessity of prividing counter electro-motive force cells as is frequently the practice in systems of this character. In my arrangement I also provide means for making the proper potential and current readings during the operation of the system, and thereby safeguard my apparatus against extraordinary drains and also prevent the battery from becoming over-charged, as is frequently the case with switchboards for isolated plants where extreme simplicity is striven for, but in which due precaution is not taken in providing for features as essential in small systems as in large ones. I also provide protective means, consisting of fuses and circuit breakers, whereby the system is amply protected against damage due to abnormal conditions or to improper operation by inexperienced persons.

In the smaller size isolated plants it is frequently the practice to employ internal combustion engines as the motive power for operating the generator. Inasmuch as these engines are not commonly self-starting, it is necessary to start the engine manually or by some auxiliary means. The usual practice with small engines is to start them manually. This is often inconvenient and otherwise objectionable and therefore I have so arranged the circuits of my system that the generator may be driven as a motor for short periods deriving its current directly from the storage battery, thereby providing a convenient means of starting the engine.

I have so arranged the circuits with respect to the apparatus that the features striven for are accomplished with a minimum amount of apparatus.

Figure 4:
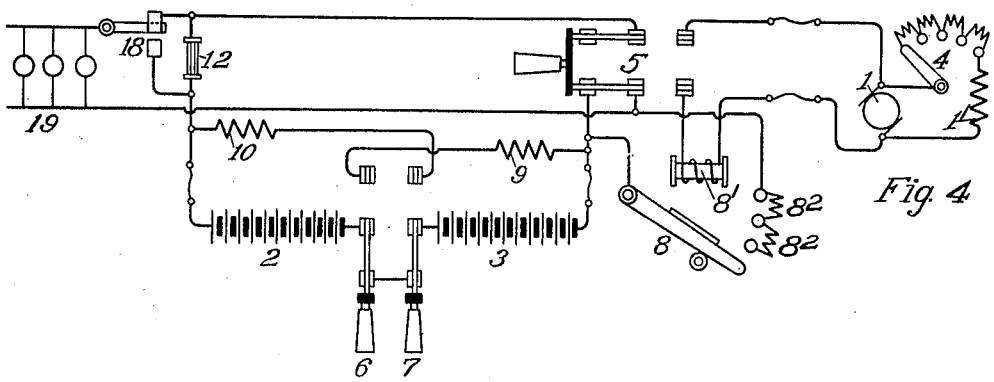
Figure 5:
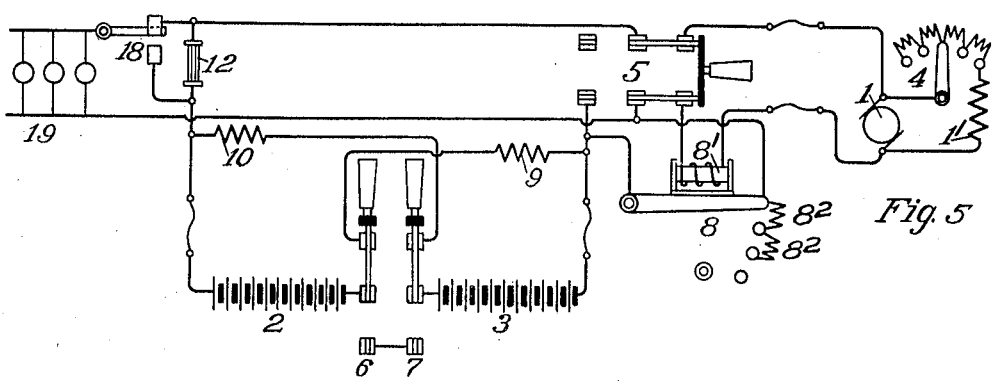
Figure 6:
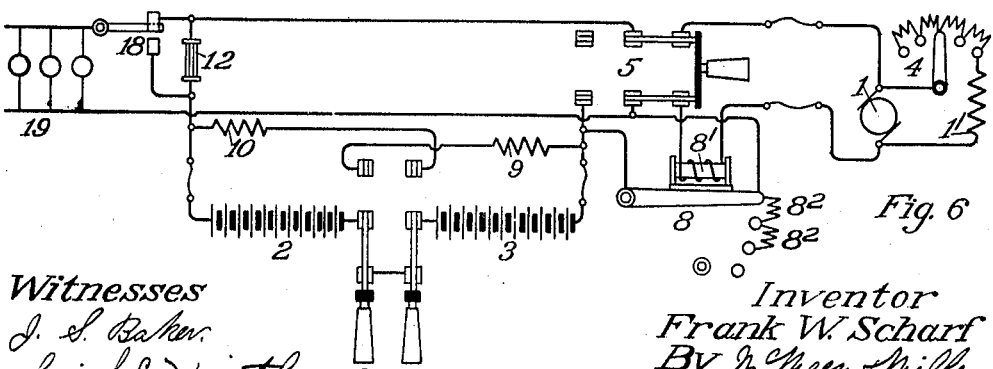

Referring to the drawings which accompany and form a part of this specification: Figure 1 is a complete circuit diagram of the essential features of a power plant employing my improved switchboard; Fig. 2 is a detail of the voltmeter switch; Fig. 3 is a simplified diagram of the circuit arrangement of the power plant when the energy consumed by the lamps or the other load is derived from the generator alone; Fig. 4 is a similar diagram of the circuit arrangement when the working current is derived from the battery alone; Fig. 5 is a similar diagram of the circuits when the generator is furnishing current both to the battery and to the connected load; Fig. 6 shows the circuit arrangement when the connected load derives its current from both the battery and the generator.

In the drawings, on which similar reference numerals refer to the same parts throughout, 1 is the armature of the generator supplying current to the entire system, and $1^1$ the field winding thereof, this generator being preferably a simple shunt machine driven by any suitable source of power. The storage battery, which acts as an auxiliary to the generator, is divided into two sections, 2 and 3, so arranged in connection with the various switches as to be readily connected either in multiple or series, across the supply leads or service mains extending from the generator to the connected load. The generator regulator, or field rheostat, is shown at 4, and is preferably connected as shown directly in the field circuit, although any of the well known methods of field regulation may be employed.

The main switch, capable of connecting either the generator or the battery to the service mains, is shown at 5, and is preferably in the form of an ordinary double throw, double pole knife switch. The battery switches are represented at 6 and 7, respectively, and these are preferably separate single pole, double throw switches, so as to allow of their independent operation. These switches control the connection of the battery sections with each other and with the charging and discharging leads, it being obvious that when the two switches are thrown down, as indicated in Fig. 4, the two battery sections will be connected in series, and that when they are both thrown up, as shown in Fig. 5, the two battery sections will be connected in multiple with each other, each having included in its circuit one of the compensating resistances 9 and 10. In the circuit of the generator there is included the coil $8^1$ of a combined automatic circuit-breaker and motor starter 8. In connection with the movable arm of this safety device, there is a rheostat composed of resistance units $8^2$, which serves to regulate the flow of current to the armature 1 when it is desired that the generator shall act temporarily as a motor, the device 8 then performing the well known functions of a motor starter.

In order that the current flowing in the various circuits and the voltage across the various parts of the system may be readily determined, I provide a combined ammeter and voltmeter 11 having an active winding $11^1$ and an inactive voltage resistance $11^2$. An ammeter shunt 12 of well known form is provided, properly calibrated as to resistance, to deflect the necessary portion of the current to be measured into the active winding $11^1$. The switch 13 serves when manually operated to disconnect the active coil of the measuring instrument from the shunt and to connect it in series with the resistance $11^2$ across the pressure wires 14 and 15 leading to the voltmeter switches 16 and 17. The plug shown in Fig. 2 forms a part of these voltmeter switches. This plug, which is of a common type, has four contact rods or points $16^1$, $16^2$, $16^3$ and $16^4$, metallically connected together in pairs as shown. These contact points are adapted to engage the sockets of the switches 16 and 17, and it is obvious that by its use the pair of pressure leads may be connected across the various working circuits of the system, the plug always being applied to the stationary terminals of the voltmeter switches so that its connecting strips remain horizontal for the arrangement of the terminals shown in Fig. 1.

In order that the shunt 12 of the ammeter may be connected either in the generator or the battery circuit, the switch 18 is provided. This is a simple, single pole, double throw switch, of the make-before-break type, so that it may never open the circuit between the connected load and the generator or battery.

I have indicated the connected load by the numeral 19, and have shown this load composed of lamps and a motor, these parts being represented by the usual conventional symbols. It is obvious that this connected load may consist also of heating devices or any other types of translating devices.

The functions of the various switches and other apparatus may be best understood from the consideration of Figs. 3, 4, 5 and 6. In Fig. 3 the battery switches 6 and 7 are shown open, as is also the switch of the circuit-breaker 8. Under these conditions and with the main switch thrown to the right as indicated, the current developed by the generator passes directly to the connected load, the battery being wholly disconnected. With the two battery switches 6 and 7 thrown down and the main switch to the left as shown in Fig. 4, the generator is entirely disconnected while the two sections of the battery act in series to furnish current to the connected load; the voltage of the battery so connected being that required by the translating devices on the service mains. With the two battery switches thrown up, the main switch thrown to the right, and the switch of the circuit-breaker closed as indicated in Fig. 5, the generator furnishes current to the connected load and also to the two sections of the battery in multiple. If the load is disconnected as by turning off the various lamps, the whole current of the generator passes through the sections of the battery to charge it, and is all available for charging purposes. The resistance units 9 and 10 are so proportioned as to prevent the battery from draining so great a current from the charging mains as to injure the battery or lower the voltage across the connected load beyond the required limits. Obviously, if it is desired to charge one section only of the battery, this may be done by throwing one only of the battery switches into its upper position, the circuit otherwise remaining as in Fig. 5. It will be seen that the switch of the circuit-breaker 8 acts in this case to connect the battery across the supply mains even though the main switch is thrown to the right. The lever of this circuit-breaker is retained in its closed position by the magnet 8¹, as is usual with starters and similar safety appliances, and as a result of this, if the generator should stop or for any other reason fail to generate there would be a cessation of current through the coil 8¹ which would cause the release of the lever and the opening of the circuit between the battery and the generator, thus preventing a dangerous flow of current from the battery through the generator. With both battery switches thrown down, the main switch thrown to the right, the circuit breaker 8 closed as in Fig. 6, the battery sections are connected together in series across the mains leading from the generator to the connected load, and thus the battery assists the generator in supplying current to the consuming apparatus. The two sources of current supply may be thus brought into commission at times of maximum load, the battery at such times serving not only to assist the generator in carrying the load but also to make more steady the voltage across the mains. If under these circumstances the current from the generator is in excess of that consumed by the load, the excess will flow into the battery serving to increase its charge. The circuit-breaker in this case acts, as before, to guard against a discharge of the battery through the generator, should the generator for any reason fail to develop the required voltage.

One of the inconvenient features of developing electric power from internal combustion engines arises from the fact that such engines are not self-starting. In order to obviate the necessity of manual starting, I provide for the temporary employment of the generator as a motor, the current for driving it being derived from the storage battery. With the generator at rest and the switches, 5, 6 and 7 in the position shown in Fig. 6 and with the lever arm of the device 8 in its normal position the generator armature will be disconnected from the battery. If, now, the lever arm of the device 8 be manually moved so as to engage successively the buttons of the rheostat current will flow from the battery through the generator armature and field, and will be admitted thereto gradually by virtue of the resistance units 8². The device 8, therefore, acts as an ordinary motor starter, and the generator is made to serve as a motor to revolve the internal combustion engine through its preliminary cycle necessary for starting. This being done the engine begins to operate of its own accord and as it reaches its normal speed drives the armature 1 instead of being driven by it. The armature of the device 8 having been moved to its closed position in which all of the resistance is cut out, is held by the attraction of the magnet 8¹ after the generator reaches its normal speed and begins to supply current to the line.

I am aware that it is not new to float a storage battery across a line between a generator and a connected load, nor to drive a battery so as to charge its sections in multiple and discharge them in series; nor to temporarily employ a generator as a motor to start an internal combustion engine which is to drive it as a generator; but I believe that the system which I have disclosed herein, which accomplishes all of these purposes, with apparatus of the greatest simplicity, and which further provides means for observing the voltage and current in the various portions of the system and for safeguarding the generator against injury by abnormal flow from the battery, to be novel and to possess advantages not hitherto attained.

Having thus disclosed my invention, what I claim as new and desire to secure by Letters Patent is:—

1. In a power plant switchboard system; a generator, a storage battery, service mains, a main switch adapted to connect either said generator or said storage battery across said mains and an automatic circuit-breaker adapted also to connect said storage battery across said service mains when said main switch is thrown to connect said generator across said mains, said automatic circuit breaker having a release coil in said generator circuit, substantially as described.

2. In a power plant switchboard system; a generator, a storage battery, service mains, a main switch adapted to connect either said generator or said storage battery across said mains and an automatic circuit-breaker adapted also to connect said storage battery across said service mains when said main switch is thrown to connect said generator across said mains, and a holding coil for said circuit-breaker adapted to release said circuit-breaker to disconnect said battery when said generator becomes deënergized, substantially as described.

3. In a power plant switchboard system; a generator, a storage battery, service mains, a main switch adapted to connect either said generator or said storage battery across said mains and an automatic circuit-breaker adapted also to connect said storage battery across said service mains when said main switch is thrown to connect said generator across said mains, and switches adapted to divide said storage battery and to connect its subdivided portions across said service mains, substantially as described.

4. In a power plant switchboard system; a generator, a storage battery, service mains, a main switch adapted to connect either said generator or said battery with said service mains, a pair of charging resistance units, a pair of battery switches each adapted to subdivide said battery and to connect the corresponding portions of said battery across said service mains in series with one of said charging resistances and an automatic circuit-breaker adapted to connect said battery across said mains, when said main switch is thrown to connect said generator across said mains, substantially as described.

Signed by me at Sioux City, county of Woodbury, and State of Iowa in the presence of two witnesses.

FRANK W. SCHARF.

Witnesses:
　MAX McGEARY,
　F. D. SMITH